United States Patent
Persson (10) Patent No.: US 7,699,156 B2
(45) Date of Patent: Apr. 20, 2010

(54) APPARATUS AND METHOD FOR TURNING CONTAINERS

(75) Inventor: Richard Persson, Landskrona (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 970 days.

(21) Appl. No.: 10/583,305

(22) PCT Filed: Nov. 24, 2004

(86) PCT No.: PCT/SE2004/001719

§ 371 (c)(1),
(2), (4) Date: Jun. 15, 2006

(87) PCT Pub. No.: WO2005/058703

PCT Pub. Date: Jun. 30, 2005

(65) Prior Publication Data

US 2008/0304950 A1    Dec. 11, 2008

(30) Foreign Application Priority Data

Dec. 16, 2003 (SE) .................................. 0303423

(51) Int. Cl.
*B65G 47/244* (2006.01)
(52) U.S. Cl. ................. 198/375; 198/377.01; 198/377.1
(58) Field of Classification Search ................. 198/375, 198/377.01, 377.07, 377.1
See application file for complete search history.

(56) References Cited

U.S. PATENT DOCUMENTS

| 4,330,288 | A | * | 5/1982 | Russell et al. ............... 493/197 |
| 4,456,422 | A | * | 6/1984 | Swayze ........................ 269/26 |
| 4,545,476 | A |   | 10/1985 | Calvert |
| 6,520,314 | B1 | * | 2/2003 | Seiling ........................ 198/375 |
| 2004/0020746 | A1 | * | 2/2004 | Tweedy et al. ......... 198/377.01 |

FOREIGN PATENT DOCUMENTS

| DE | 24 27 818 A1 | 2/1976 |
| DE | 41 25 342 A1 | 4/1993 |
| EP | 1 123 886 A1 | 8/2001 |
| EP | 1 203 736 A2 | 5/2002 |
| SE | 50 58 28 C2 | 10/1997 |

* cited by examiner

*Primary Examiner*—Mark A Deuble
(74) *Attorney, Agent, or Firm*—Buchanan Ingersoll & Rooney PC (57) ABSTRACT

The disclosure relates to an apparatus (10) comprising a turning mechanism which is adapted to change the orientation of a number of packaging containers (12) in motion in a filling machine, from a first orientation (20) to a second orientation (22), comprising a conveyor (26) provided with at least one carrier (28) to which at least one carrier unit is connected. According to the invention, the carrier unit is rotary in relation to the carrier (28) about a geometric axis of rotation and is adapted to carry the packaging container (12) in such a manner that the point of gravity of the packaging container during the change in orientation is substantially located on the geometric axis of rotation, and the point of gravity of the packaging container thereby maintains substantially the same direction and speed from the first to the second orientation (20, 22).

19 Claims, 8 Drawing Sheets

APPARATUS AND METHOD FOR TURNING CONTAINERS

TECHNICAL FIELD

The present invention relates to an apparatus including a turning mechanism which changes the orientation of packaging containers in motion in a filling machine.

BACKGROUND ART

Machines for packing food products, for example packaging containers with liquid foods such as, for example, juice, milk, etc. or foods of a more solid nature such as, for instance, soups, vegetables etc. often have a production line with conveyors for conveying the packaging containers during different phases along the production line. These phases may consist of one or more filling steps, sealing steps or folding steps in a series of different combinations, or may comprise other functions.

In or before, for example, a folding- or sealing step, the moving packaging container and those devices which fold or seal the packaging container must be in the correct orientation in relation to one another so that the folding or sealing operation may be carried out correctly. In principle, there are two variations of orientation. Either each packaging container maintains its orientation in which event the device for folding or sealing, respectively, is oriented in relation to the moving packaging container, i.e. the device for folding or sealing adapts its orientation. Alternatively, each packaging container is rotated, i.e. oriented in the correct orientation and the device for folding or sealing is stationary. This latter alternative usually gives a higher degree of reliability in folding or sealing of packaging containers in motion. One method of realising this orientation of the packaging containers is to employ a conveyor with a rotating device which changes their orientation, i.e. rotates the containers from a first to a second orientation so that a different side of the packaging container which, for example, is at right angles to and adjacent in relation to the front side in the first orientation becomes the front side in a second orientation in the continued direction of movement on the conveyor. Naturally, both of these methods of orientation may be combined so that both the package and the folding devices carry out a part of the orientation movement.

Publication WO 0228716 describes an apparatus for turning packaging containers in a filling machine. This apparatus receives, moves, rotates and passes on moving packaging containers, from an incoming first orientation to a second orientation. The apparatus discharges the moving packaging containers in the same direction of movement in their second orientation as in their first orientation, but the packaging containers have been rotated through 90°. The rotation is put into effect by a sweeping movement, and the apparatus consists of a rotating wheel on which carrier units are rotatably secured. Each carrier unit is secured via a carrier shaft which extends axially through the rotating wheel with its axis of rotation parallel with the axis of rotation of the rotating wheel. However, it has proved that this construction suffers from a number of drawbacks which occur principally when the apparatus is run at a high speed. Problems which have occurred are, for example, that the package may be damaged when the carrier unit holds or discharges the package and that the package occasionally shows a tendency to jump out of the subsequent part of the machine in connection with discharging from the carrier unit.

SUMMARY OF THE INVENTION

One object of the present invention has thus been to realise an apparatus for turning packaging containers in a filling machine where the turning operation is put into effect in a gentler manner which minimizes the risk of damage to the packaging container during the turning phase and when the package, after being turned, is advanced further to the next production step. It has been possible to realise this by means of an apparatus which comprises a turning mechanism which is adapted to change the orientation of a number of packaging containers in motion in a filling machine, from a first orientation to a second orientation, comprising a conveyor which is provided with at least one carrier to which at least one carrier unit is connected. The present invention is characterised in that the carrier unit is rotary in relation to the carrier about a geometric axis of rotation and is adapted to carry the packaging container in such a manner that the point of gravity of the packaging container during the change in orientation is substantially located on the geometric axis of rotation, and that the point of gravity of the packaging container thereby maintains substantially the same direction of movement and speed from the first to the second orientation. In that the point of gravity of each packaging container maintains the same speed and direction of movement, i.e. substantially follows the same line, from the first orientation to the second orientation, the apparatus may be run at considerably higher speeds before account must be taken of any possible delayed movement such as a standing wave or similar recoil in the contents of the packaging container. In that the action of the contents on the packaging container is reduced to a minimum, the risk of damage to the packaging container because of jolts against surrounding parts in the apparatus or the next conveyor is reduced to a minimum. Another advantage is that the packaging containers need not be held excessively tightly during the turning operation, which gives a less complex design and construction for the carrier unit. This also entails that the abutment surface between the carrier unit and the packaging container may be reduced, which in turn contributes in reducing the risk that undesirable marks on the decorative artwork of the package occur.

In one preferred embodiment of the present invention, the carrier comprises a first carrier member and a second carrier member, at least one of the carrier members being displaceable in relation to the other in a first direction, and the carrier unit being rotatably connected to each carrier member where each respective rotary connection is located a distance from each other in a second direction transversely of said first direction. In that the rotary connections are located in spaced apart relationship from one another in a direction transversely of that direction in which the carrier members are displaced, a movement of the carrier members in relation to one another because of geometry will result in a rotation of the carrier unit. This in turn results in a turning of the packaging container.

Preferably, the apparatus according to the present invention is further characterised in that the carrier unit is non-rotationally connected to a shaft which is journalled in one of the carrier members. Further, the carrier unit is provided with a pin which is moveable in a track provided in the second carrier member. The mutual relationship of the shaft and the pin is such that a displacement of at least one of the carrier members in relation to the other entails a rotation of the carrier unit which corresponds to a change of the orientation of the packaging container from the first to the second orientation. By forming the carrier members in this manner, a construction will be attained which comprises few parts, is simple, robust and economical and which nevertheless solves the above-outlined problems.

Preferably, the shaft coincides with the geometric axis of rotation, which is a simple and robust method of realising the desired rotary movement.

In one preferred embodiment, the carrier unit is provided with a pair of finger portions adapted to carry the packaging container, the finger portions being adapted in relation to the geometric axis of rotation such that the point of gravity of the packaging container coincides with said axis of rotation. By such means, it will be possible for the packaging container to maintain substantially the same direction and speed on turning.

According to a further preferred embodiment, the packaging containers which are fed are of a type whose corner flaps point substantially straight out from the sides of the packaging container, and the finger portions of the carrier unit are adapted to be able to carry the packaging container by means of abutment under these corner flaps. By such means, the packaging containers can quite simply and reliably be lifted and turned, and the risk of visible marks or damage to the artwork or printing on the packaging containers is reduced to a minimum. Another advantage inherent in providing the carrier unit with finger portions is that the carrier unit will then be substantially dependent only on the bottom configuration of the packaging container. It is thus possible to change the volume of the packaging container without needing to retro construct the finger portions (as long as the bottom configuration is the same). The entire apparatus is raised or lowered instead in relation to surrounding conveyors. However, should a change to the bottom configuration of the packaging container be put into effect, this does not lead to any major retro construction since only the finger portions of the carrier unit then need to be replaced. This affords a highly flexible and economically viable solution.

Preferably, the finger portions cooperate with at least one arrest heel which is adapted to abut against the one fold edge of each respective corner flap. When the packaging container abuts against the arrest heel, it can be ensured that the point of gravity of the packaging container will lie on the geometric axis of rotation. The arrest heel also ensures that the packaging containers will be supported in the same manner in all carrier units regardless of whether any packaging container initially enters, for example, obliquely into the carrier unit.

In one preferred embodiment, the carrier members are moveable in relation to one another in that the conveyor comprises a number of tracks which each form its loop, the carrier members are guided in the tracks and the tracks comprise switching sections which each permit that at least one of the carrier members may change track. This is a simple and operationally reliable method of making the carrier members moveable in relation to one another. The advantage is also that the tracks may simply be manufactured from, for example, sheet metal or the like and the switch sections may simply be milled out of plastic blocks. This gives a solution which is considerably more economical than one which comprises, for example, cam surfaces milled in steel which run around the entire conveyor.

It is to be preferred that, while the container is located in its first orientation, the finger portions point in a direction substantially transversely of the direction of transport of the containers and, while the container is located in its second orientation, the finger portions point in a direction substantially rearwards in relation to said direction of transport. By such means, the carrier unit may easily carry the container by being moved transversely of the direction of transport of the conveyor, and the hand-over to an outgoing conveyor will be very simple, since the finger portions will slide out of their position under the corner flaps without the orientation of the packaging container needing to be changed.

Preferably, the carrier members are displaceably journalled on at least one shaft, the shaft being interconnected with a belt, provided for the conveyor, by means of a clamping device. By securing the carrier members on shafts which are then interconnected to the belt by a clamping device, the advantage will be afforded that the carrier members can easily be replaced without the belts needing to be dismounted or replaced. Thus, the time required for maintenance work can be reduced and, since also the number of parts needing to be replaced is fewer, the apparatus will be superior from the economic point of view. This affords a very simple, economical and stable construction with few parts and the downtime which is expensive from the capital investment viewpoint may be shortened.

In one preferred embodiment, the belt is comprised in a belt transmission which also comprises at least one pulley over which the belt is adapted to run, the carrier members being displaceably journalled on two shafts, these shafts being interconnected with said belt, and the centre points of the shafts being displaced a distance from the pitch line of the belt in a direction substantially at right angles thereto outwards from the pulley so that the mutual spacing between the two shafts is of equal size when both of the shafts are located above said pulley and when they are located in a portion of the transmission where the belt is substantially straight. By displacing the centre point of the shaft a distance from the pitch line, it will be possible to realise synchronous driving also when using belt drive for an apparatus for turning packaging containers. A construction including complete cam curves and linear guiding can thus be avoided. This enjoys numerous advantages, for example an apparatus may be realised which comprises few parts, this being advantageous from both the viewpoint of cleaning and wear. Similarly, there will be obtained an apparatus which is light in weight.

In a further preferred embodiment, the length of said distance is the difference $r_1-r_0$, where $r_0$ is the radius from the centre of the pulley to the pitch line and $r_1$ is calculated in accordance with the formula $$r_1 = \frac{a}{2\sin\left(\frac{a}{2r_0}\right)}$$

where a is the mutual distance between two shafts when the belt is straight.

Preferably, the belt is a toothed belt. By such means, conventional belts may be employed and it will shortly be shown that the securement of the shafts is facilitated by the teeth of the toothed belt.

In one preferred embodiment, the clamping device for securing the shaft to the belt comprises a first part adapted for whole or partial abutment in a tooth gap in the belt and in support means in the shaft, the support means forming continuations of the tooth gap at each end thereof and in which support means the first part can be snapped down, and the first part at each end is connected to a second part in the form of a yoke element, the yoke elements being adapted to surround the shaft so that there is formed a wrapping angle between the abutment points of the first part in the support means in the shaft and the abutment points of the yoke elements against the shaft which is sufficiently large for the geometry of the shaft to be capable of retaining the clamping device in a secured position. As a result of a clamping device of this type, the carriers can quite simply be secured on the belt and if one or more carriers were to need to be replaced, only this or these need to be removed from the belt. The clamping device proper is per se simple and economical to manufacture.

Preferably, the shaft is provided with at least one depression adapted at least partly to accommodate the belt and in which depression the support means are placed. By providing the shaft with a depression for the belt, it will be very simple to position the centre point of the shaft a distance from the pitch line of the belt.

The present invention also relates to a method of changing the orientation of a number of packaging containers in motion in a filling machine, from a first orientation to a second orientation. The method comprises carrying a packaging container by a carrier unit which is connected to a carrier in a conveyor and turning the carrier unit in relation to the carrier about a geometric axis of rotation in such a manner that the point of gravity of the packaging container will, during the change in orientation, substantially be located on the geometric axis of rotation, and the point of gravity of the packaging container will thereby retain substantially the same direction of movement and speed from the first to the second orientation. As was previously mentioned, this affords the advantage that a change of the orientation of a container from a first orientation to a second orientation may be put into effect at considerably higher speeds before account need be taken of any possible delayed movement such as a standing wave or similar recoil in the contents of the packaging container. In that the action of the contents on the packaging container is reduced to a minimum, the risk of damage to the packaging container because of jolts against surrounding parts in the apparatus which carries out the change or the next conveyor is reduced to a minimum. Another advantage is that the packaging container need not be held excessively tightly on turning, which gives a less complex construction for the carrier unit. This also entails, as was mentioned previously, that the abutment surface between the carrier unit and the packaging container may be reduced, which in turn contributes in reducing the risk of undesirable marks occurring in the decorative artwork on the package.

BRIEF DESCRIPTION OF THE ACCOMPANYING DRAWINGS

One currently preferred embodiment of the present invention will be described in greater detail hereinbelow, with reference to the accompanying Drawings. In the accompanying Drawings.

DETAILED DESCRIPTION OF ONE PREFERRED EMBODIMENT

Figure 1:
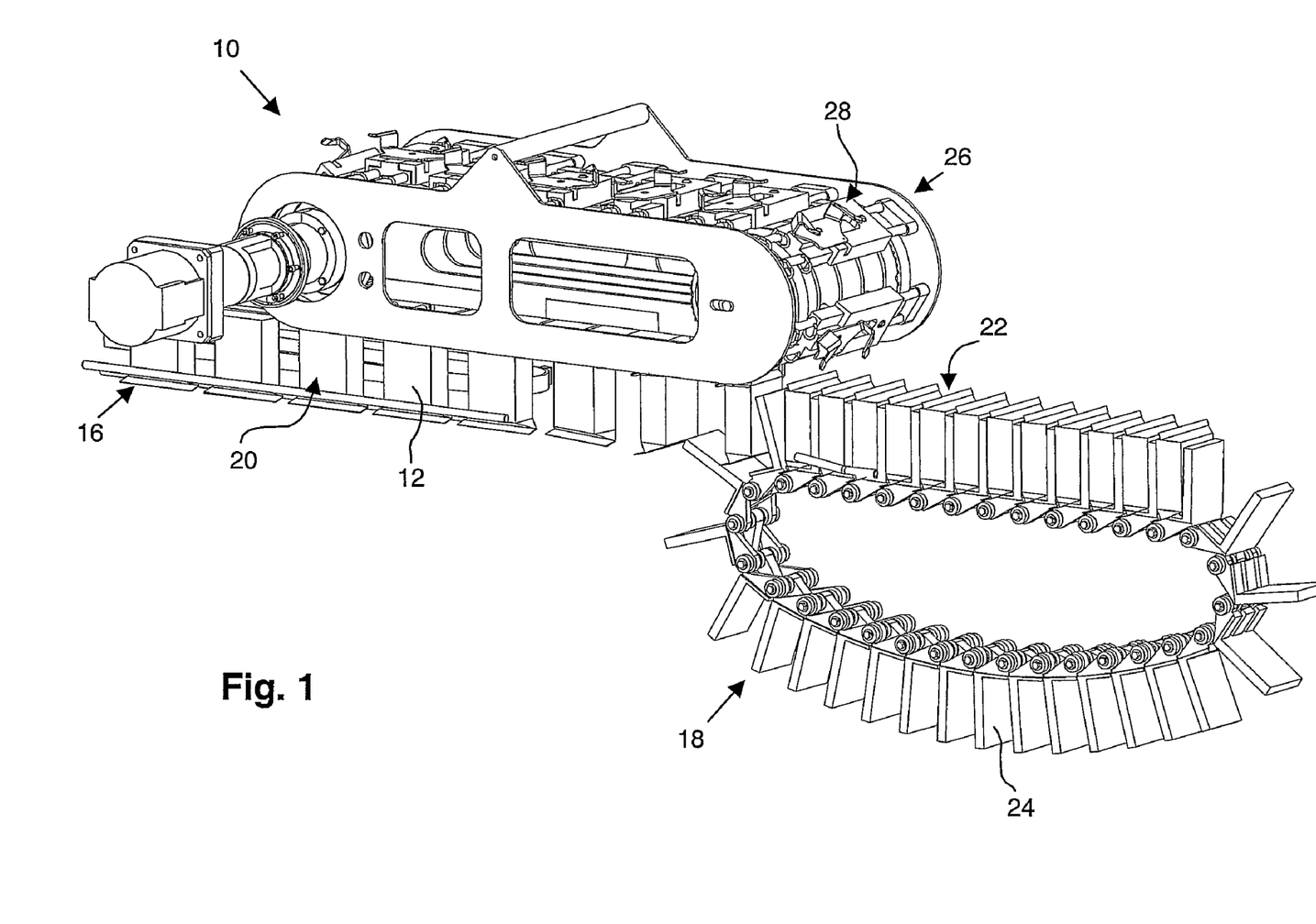
FIG. 1 schematically illustrates a view in perspective of an apparatus according to the present invention with conveyors and packaging containers in motion.

FIG. 1 shows one preferred embodiment of an apparatus, generically designated by reference numeral 10, for changing the orientation of moving packaging containers 12 prior to a production step in a filling machine for packing products, for example foods. In the example, the packaging containers are parallelepipedic packages produced from a laminated packaging material comprising a core layer of, for example, paper or paperboard and outer, liquid-tight layers of plastic. Such packaging containers are occasionally produced from individual blanks which have been produced from material sheets and formed into a tube by overlapping joining of their longitudinal edges. Thereafter, the tube is sealed along its one transverse edge adapted transversely of the longitudinal direction of the tube, the packaging container then being filled and sealed at its other transverse edge. Before the sealing operations, the blank is flattened in the transverse sealing region. After the filling and final folding, where applicable additional forming and fusing operations are implemented and, in parallelepipedic packages 12, the double-walled corner flaps 14 of the cushion-shaped packaging containers are folded in towards and sealed to the outside of the packaging container.

The apparatus 10 in the present invention is located between a transverse sealing station (not shown) and a subsequent final folding station (not shown), where the double-walled corner flaps 14 are folded in towards and sealed to the outside of the packaging container. The corner flaps 14 of the packaging container thus point, in this position, substantially straight out from the sides of the packaging container. The apparatus cooperates with an incoming first and outgoing second conveyor 16, 18, of which the incoming conveyor 16 feeds the packaging containers 12 from the transverse sealing station to the apparatus 10 and the outgoing conveyor 18 feeds the packaging containers 12 from the apparatus 10 to the final folding station.

The apparatus 10 receives, turns and passes on each moving packaging container 12 from an incoming, first orientation 20 to the left in the figure to a second orientation 22 to the right in the figure. Thus, the packaging containers 12 are fed in their first orientation 20 in the incoming conveyor 16 and arrive at the apparatus 10 in the same orientation 20 in order subsequently to be turned and received in their second orientation 22 by the outgoing conveyor 18 which feeds the packaging containers 12 further. The apparatus 10 ensures that the moving packaging containers 12 maintain the same direction of movement and the same speed in their second orientation 22 as in their first orientation 20. The direction of transport of the moving packaging containers 12 is indicated by arrows from left to right in the figure.

The incoming conveyor 16 may be of a conventional type which is known to a person skilled in the art. In the example, it is of the belt conveyor type which cooperates with a sliding rail. In one region, the rail and the belt run parallel. The packaging containers 12 stand on the sliding rail in their first orientation and are pressed or urged forwards along the rail with the aid of carriers in the form of blocks disposed with uniform spacing on the belt. The belt conveyor is driven and guided by a drive unit (not shown) in a manner conventional to a person skilled in the art. Naturally, the incoming conveyor 16 may, however, be of other type than that described, for example may be a chain conveyor. The outgoing conveyor 18 may also be of a conventional type and, in the example, it is of the belt conveyor type provided with carrier units 24. The belt conveyor 18 is driven and guided by a drive unit (not shown) in a manner conventional to a person skilled in the art. Both of the conveyors 16, 18 are synchronised with the apparatus 10.

In order to be able to take packaging containers 12 from the incoming conveyor 16 and feed them to the outgoing conveyor 18, the apparatus 10 comprises a conveyor 26 which is provided with a number of carriers 28 in order to entrain the packaging containers 12. The conveyor 26 is provided with a belt for driving the carriers 28. The term "belt" is here taken to signify, for example, a chain or a belt such as, for example, a toothed belt. In the example, the conveyor 26 is provided with a first and second belt 34, 35, see FIG. 10. The belts 34, 35 run substantially parallel a distance from one another over pulleys (which latter will be described below) in a manner conventional to a person skilled in the art. In the example, the belts 34, 35 are toothed belts and are driven synchronously with one another in a counter clockwise direction in FIG. 1.

Figure 2A:
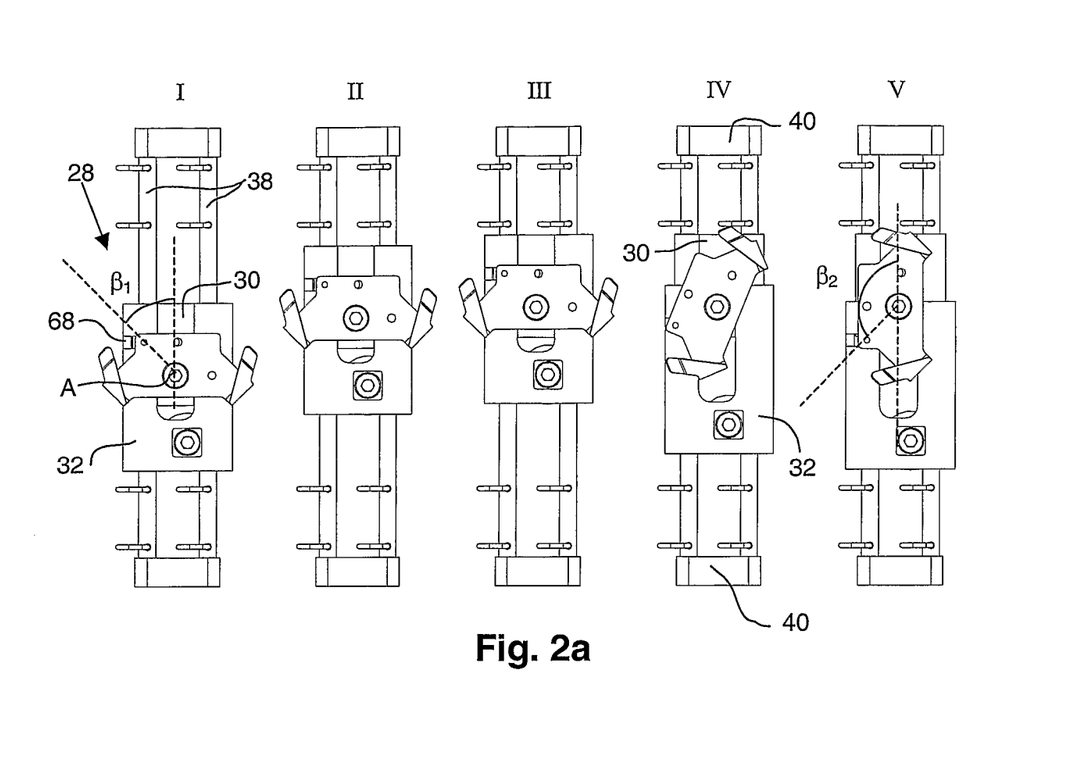
FIG. 2a schematically illustrates a series of views I-V illustrating the turning of the carrier unit, views I-V being shown from beneath with reference to FIG. 1.

Each carrier 28, see FIG. 2a, comprises a first and a second carrier member 30, 32 which are in the form of blocks and which are moveably disposed on two substantially parallel shafts 38. The blocks may preferably be manufactured from plastic. In the present example, the carrier members 30, 32 are disposed in such a manner that each shaft 38 runs through both of the carrier members 30, 32. The shafts 38 are fixedly disposed on the two driven toothed belts 34, 35 in the conveyor 26 in such a manner that they bridge across the distance between the belts 34, 35. The shafts 38 are fixedly disposed substantially at right angles to the direction of movement and linkages 40, see FIG. 2a, interconnect the ends of the two shafts with one another.

Each shaft 38 is secured to both of the belts by means of at least one clamping device 42 in each belt. In the following description and with reference to FIG. 3, a first embodiment of this clamping device 42 will be described in greater detail and it will be shown how a shaft 38 can, by means of the clamping device 42, be secured to, for example, the first belt. The clamping device 42 comprises a first part 44 in the form of a pin adapted to be able to abut against the belt 31. The abutment against the belt 31 takes place in a tooth gap in the belt 31. The pin 44 is also adapted to be able to be snapped down in support means 46 formed in the shaft 38. These support means 46 form continuations of the tooth gap at each end thereof, i.e. the support means 46 are disposed as small "tooth gaps" which are in alignment with the tooth gap in the belt 31. The pin 44 may be snapped down in the support means 46. On either side of the first part 44, i.e. in each end of the pin, there are second parts 48, 50, respectively, provided. The first part 44 is thus a centre part. The two second parts 48, 50 are substantially identical and each are in the form of a yoke element which is adapted to be able to surround the shaft 38. Each yoke element has an outer end 52, i.e. a free end, which is adapted to be snapped into a corresponding hole 54 in the shaft 38. In order that the shaft 38 be able to be positioned such that its centre point is located a distance from the pitch line, which will be described later, the shaft 38 is provided with a depression 56 adapted at least partly to accommodate the belt 31. The depression 56 is formed as a recess and has a surface which is adapted to abut against the flat surface of the belt. The surface has an extent in the longitudinal direction of the shaft which is larger than the belt 31 seen in the width direction of the belt, so that the surface may also accommodate the two yoke elements 48, 50. The support means 46 are formed in breaks in the surface, i.e. the depression 56 in the shaft 38 in actual fact consists of three sections, a central section 56a which can accommodate the belt 31, as well as two smaller outer sections 56b, 56c outside the support means 46 which can each accommodate one of the yoke elements 48, 50, see FIG. 4. The outer sections 56b and 56c are intended to support the yoke elements and take up a part of the spring force so that the clamping device does not compress down with all of its force against the belt. By such means, the risk that the pin 44 "eats" its way through the belt is minimized. Hence, it is the outer ends of the pin 44 adjacent the yoke elements 48, 50 that are snapped down in the support means 46. The support means 46 are designed so that they permit rotation of the pin 44 so that the yoke elements 48, 50 can surround the shaft 38. It should be understood that the term "surrounds" does not necessarily signify that the yoke elements 48, 50 completely abut against the shaft 38, it is sufficient that there is a point of abutment somewhere along the yoke form in addition to the point of abutment between the pin 44 and the support means 46.

Figure 5:
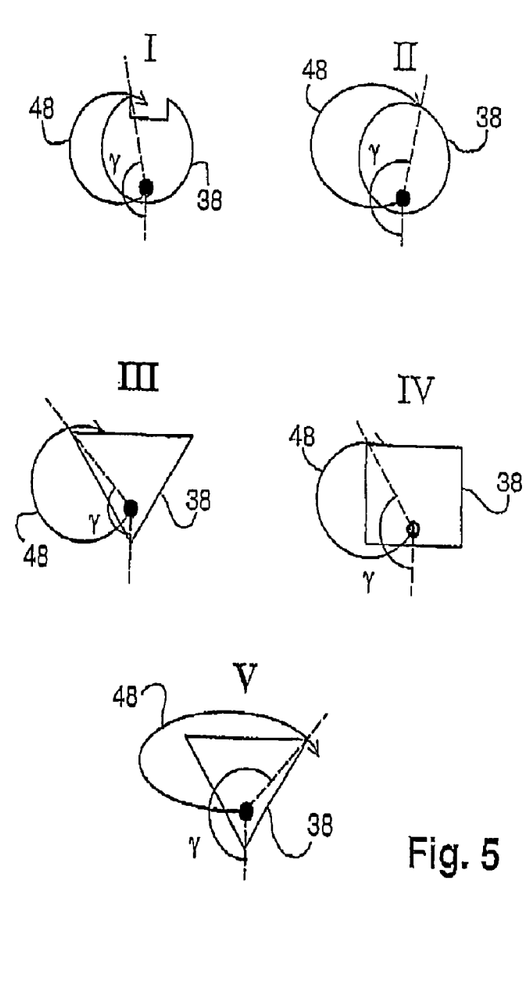
FIG. 5 schematically shows views I-V of different shaft cross sections and wrapping angles.
Figure 6:
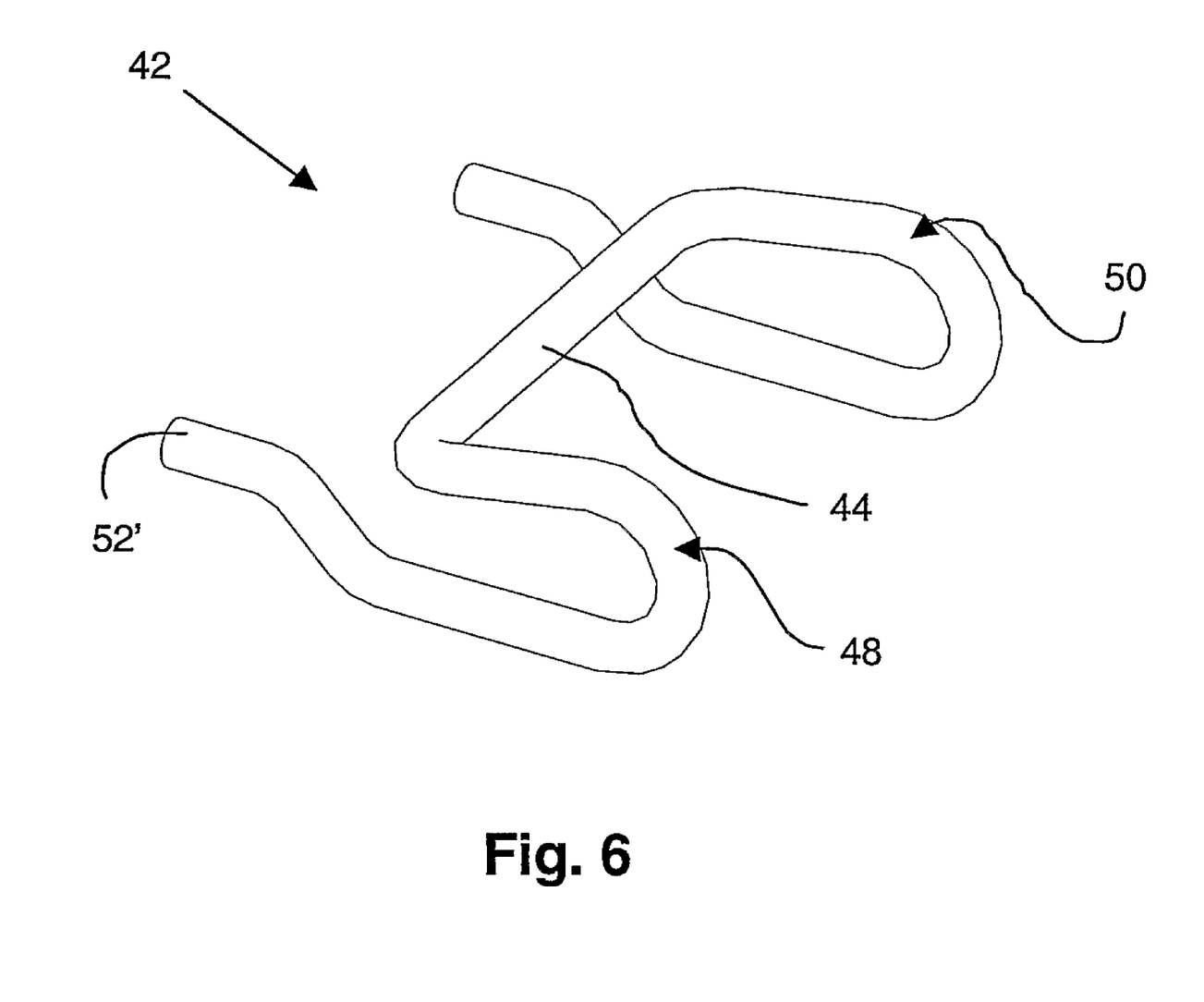
FIG. 6 schematically shows in perspective a view of a second embodiment of the clamping device.

The yoke elements 48, 50 are designed to surround the shaft 38 so that a wrapping angle γ is formed between the abutment points of the first part in the support means 46 in the shaft 38 and the abutment points of the yoke elements against the shaft 38 which is sufficiently large in order that the geometry of the shaft will be capable of retaining the clamping device 42 in a secured position, i.e. in a position where the clamping device 42 holds the belt 31 locked against the shaft 38. FIG. 5 illustrates what is meant by a sufficiently large wrapping angle γ. In view I is seen a cross section of a shaft 38 with holes 54 like that described above. Thanks to the hole 54, the abutments points of the yoke element can, in this case, display a wrapping angle γ which is slightly less than 180°. FIG. 6 shows a second embodiment of the clamping device 42 where the yoke elements 48, 50 are not intended to be snapped into holes in the shaft 38, but where outer parts 52' of the yoke elements 48, 50 are adapted merely to abut against the shaft 38. This variation requires a wrapping angle γ of at least 180°, see view II in FIG. 5. The shaft 38 may also be designed with a triangular cross section, as in view III, or with a cross section in the form of a polygon, for example a square, as shown in view IV, and then it is sufficient that the wrapping angle γ sweeps past the first corner. However, it should be understood that the configuration and cross sectional area of the yoke element are naturally of importance for that wrapping angle γ which is required. If the yoke element 48, 50 is weak, for example in that it has slight cross sectional area and large yoke configuration, a larger wrapping angle γ is probably required, see view V.

Figure 3:
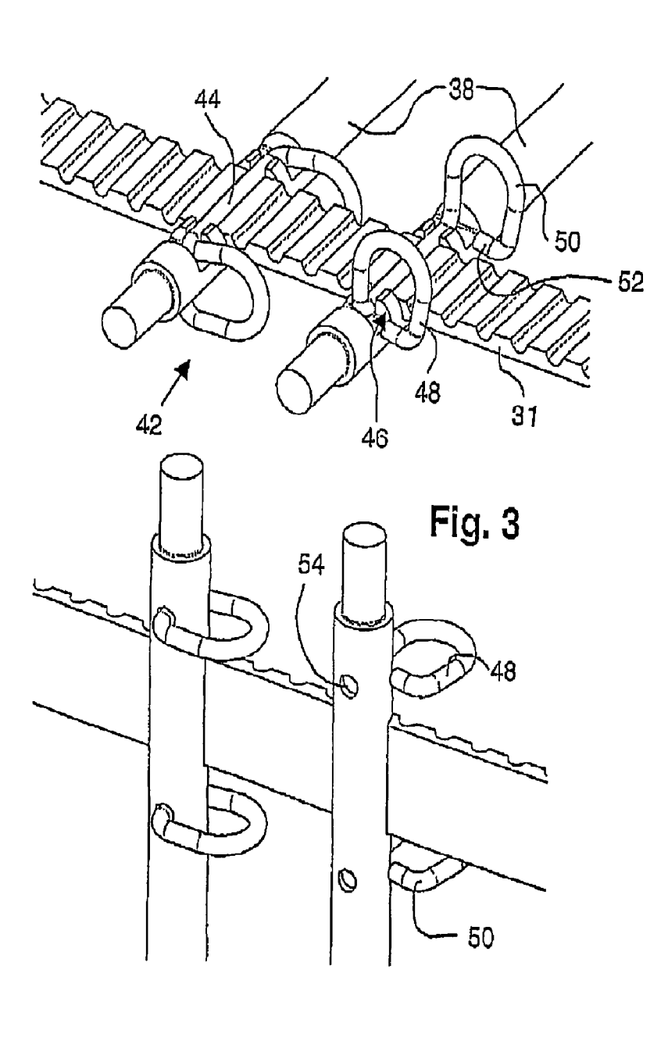
FIG. 3 schematically shows, in a number of views, a first embodiment of a clamping device and how it fixes a shaft to the belt.
Figure 4:
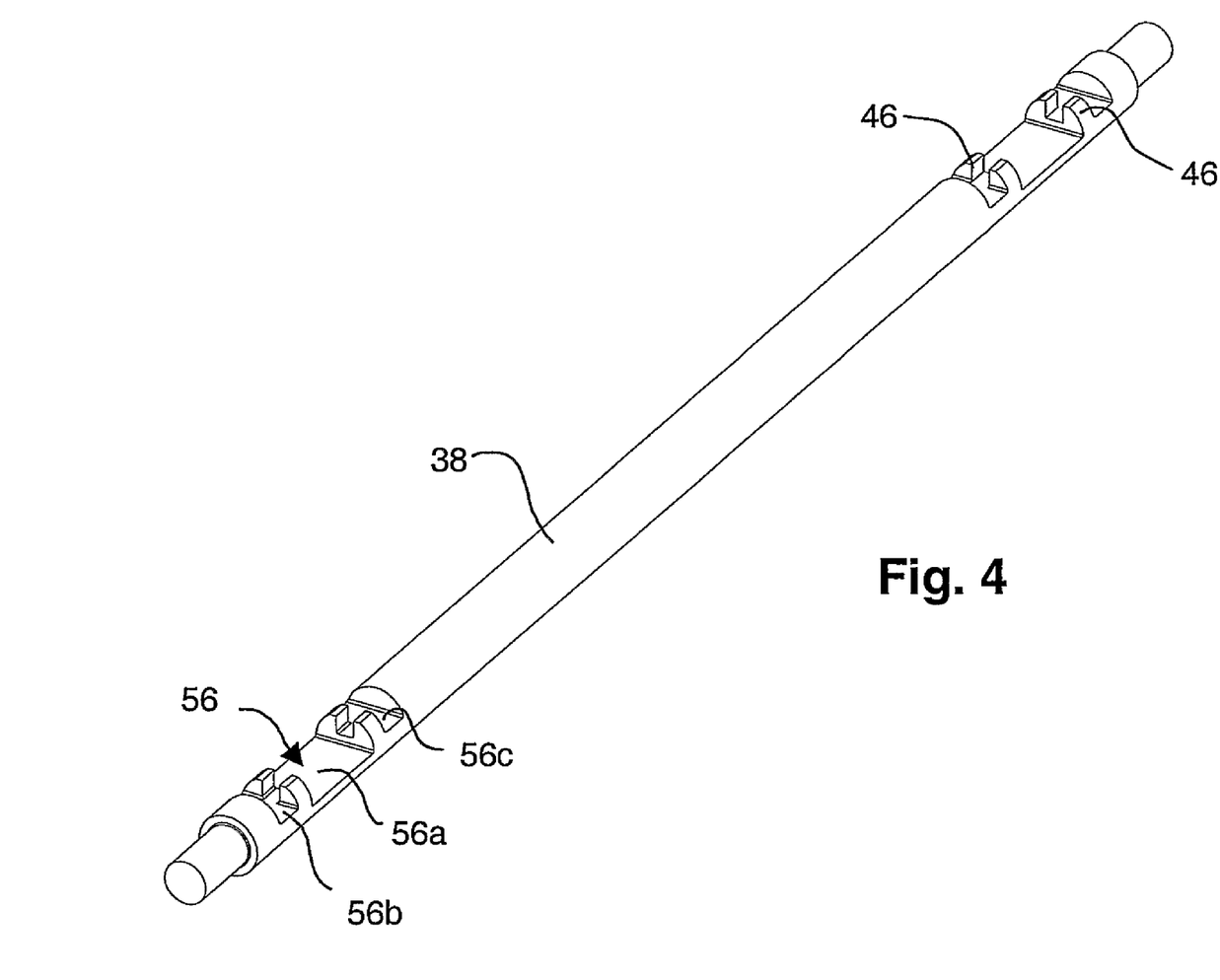
FIG. 4 schematically shows a perspective view of a shaft.

In the described first embodiment of the clamping device 42 which is shown in FIG. 3, the hole 54 in the shaft 38 is placed substantially in register with the depression 56, i.e. on the other "side" of the shaft 38. Thus, the wrapping angle γ is substantially 180°.

The clamping device 42 may simply be manufactured by bending of a steel bar.

On mounting of the clamping device 42, the toothed belt 31 is first placed so that its flat surface comes into abutment against the flat surface in the depression 56 of the shaft 38, see FIG. 3. Thereafter, the first part 44, the pin, of the clamping device 42 is pressed down in the support means 46, see the upper right-hand view in FIG. 3. Thereafter, the yoke elements 48, 50 are rotated so as to surround the shaft 38, see the upper left-hand view in FIG. 3, so that the outer ends 52 of the yoke elements 48, 50 snap into the holes 54 on the underside of the shaft 38, see corresponding lower views in FIG. 3.

In the following disclosure, the securement of the shafts 38 will be described. Since both belts 34, 35 are driven synchronously and are substantially identical both in form and positioning, the securement will only be described with reference to the first belt 34 for the sake of simplicity. When the belt 34 is countersunk in the shaft 38, the countersunk surface will always be a tangent to the belt 34 at any individual point. This also implies that the normal to this surface which passes through the centre point of the shaft will always intersect the centre point of those pulleys which the shaft 38 rotates with.

Figure 10:
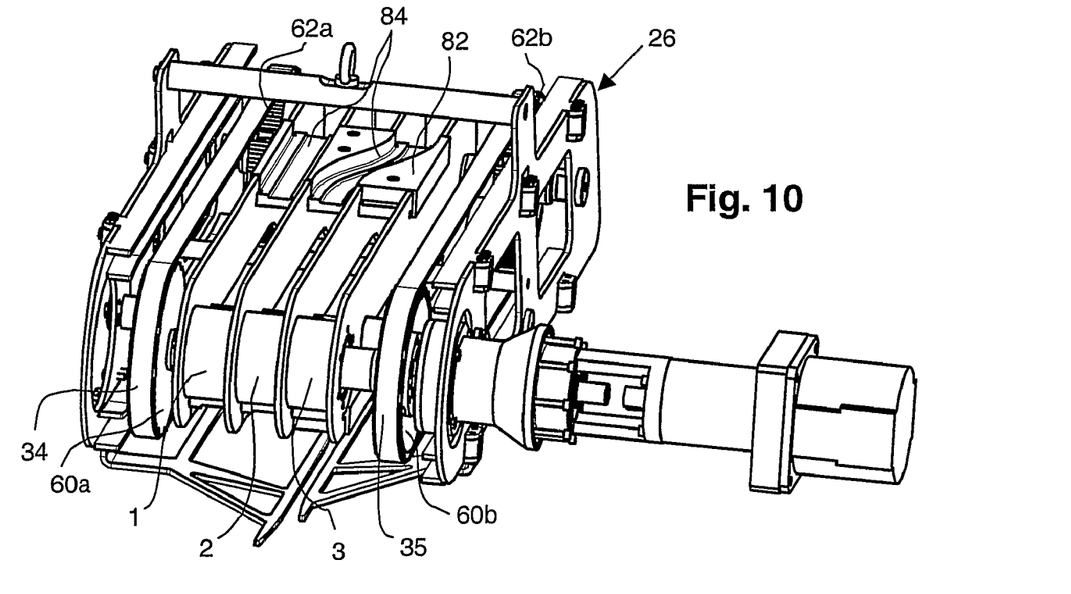
FIG. 10 schematically shows a perspective view of the conveyor with the tracks and the third switching section.

The apparatus 10 comprises, as was mentioned previously, a first and a second pulley 60, 62 disposed at the same height in the vertical direction in relation to one another, see FIG. 10. The pulleys 60, 62 are journalled between a first and a second frame (not shown) and at least the one pulley is driven by drive means. In the example, the first pulley 60 consists of a first and a second pulley part 60a, 60b which are non-rotationally interconnected to one another by means of a shaft. Correspondingly, the second pulley 62 consists of a first and a second pulley part 62a, 62b which are non-rotationally interconnected to one another by means of a shaft. The first drive belt 34 runs over the first pulley part 60a in the first pulley 60 and the first pulley part 62a in the second pulley 62. The second drive belt 35 runs over the second pulley part 60b in the first pulley 60 and the second pulley part 62b in the second pulley 62.

Figure 7:
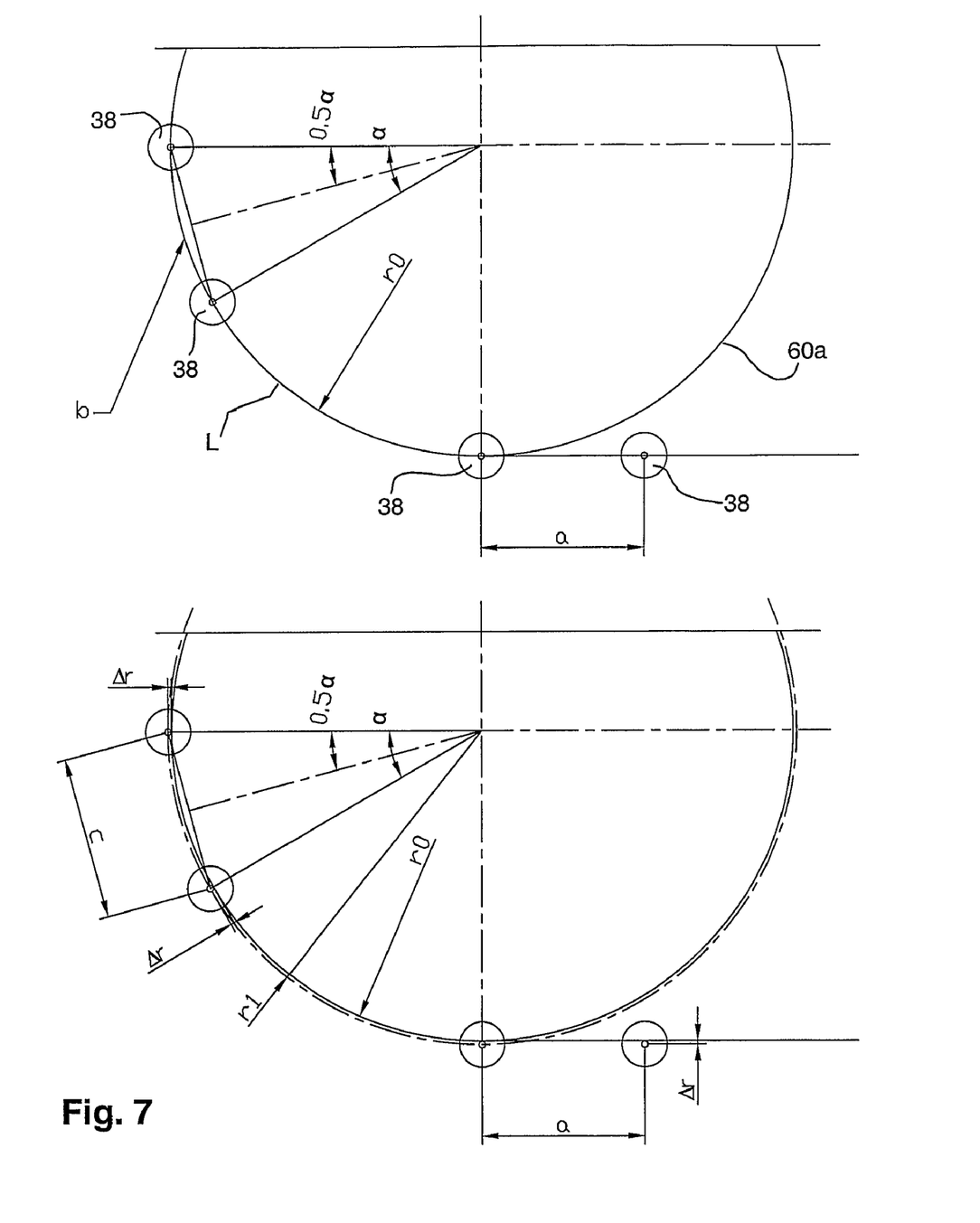
FIG. 7 schematically illustrates the fixing of the shafts.

With reference to FIG. 7, it will now be shown how to calculate the securement points of the two shafts, i.e. where the centre points of the shafts are to be located in relation to the pitch line in order that there be an equal distance between the two shafts 38 throughout in the transmission, i.e. it should be the same distance between the shafts 38 when that part of the belt 34 (and 35) to which they are secured is straight as when the same part surrounds a part of either of the pulleys 60, 62. The term pitch line is here taken to signify that line L to which the pitch radius of the pulley extends and the pitch radius in a toothed belt transmission extends from the centre of the pulley to the centre of the cord in the gear belt, i.e. to that point where the stretching is substantially zero. In the following reasoning, the pitch radius is designated $r_0$. When the belt is straight, the mutual distance between the centre points of the shafts is a. In order for this distance to be maintained when the belt is bent around the pulley, the length of the arc segment of the pitch length, here designated b, and the chord distance (the distance between the shafts 38 when they are located around the wheel), here designated c, be of equal length as a, i.e. a=b=c must apply. This is attained by moving the positioning of the centre points of the shafts a distance $\Delta_r$ out from the pitch line, i.e. in a direction out from the centre of the pulley. The centre points of the shafts will then not be located on $r_0$ from the centre of the pulley, but on a radius $r_1$ therefrom, this radius $r_1$ being longer than $r_0$. The distance $\Delta_r$ is the difference $r_1-r_0$. The formula for calculating $r_1$ is as follows:

$$r_1 = \frac{0,5c}{\sin(0,5\alpha)}$$

where c is, was mentioned previously, the desired chord between the two shafts and $\alpha$ is the angle between the two shafts and the centre of the wheel, i.e. between the previously mentioned normals to the countersunk surfaces of the shafts 38. The angle $\alpha$ is equal to b divided by $r_0$ where b is, as was mentioned previously, the length of the pitch line arc length segment. The formula for calculating $r_1$ can thereby be written:

$$r_1 = \frac{c}{2\sin\left(\frac{b}{2r_0}\right)}$$

Since b and c must be the same size as a, c and b can be substituted for a in the formula which is then worded:

$$r_1 = \frac{a}{2\sin\left(\frac{a}{2r_0}\right)}$$

The first carrier member 30 is provided with a carrier unit 58 whose task is to carry a packaging container 12. Since the apparatus 10 is to change the orientation of the packaging containers 12 from the first orientation 20 to the second orientation 22, it further comprises a turning mechanism which will now be described.

The axis A designates the geometric axis of rotation around which the packaging container is to be rotated or turned. In FIG. 2, the axis A runs in a direction substantially at right angles to the plane of the paper, i.e. inwards in the views.

Figure 8:
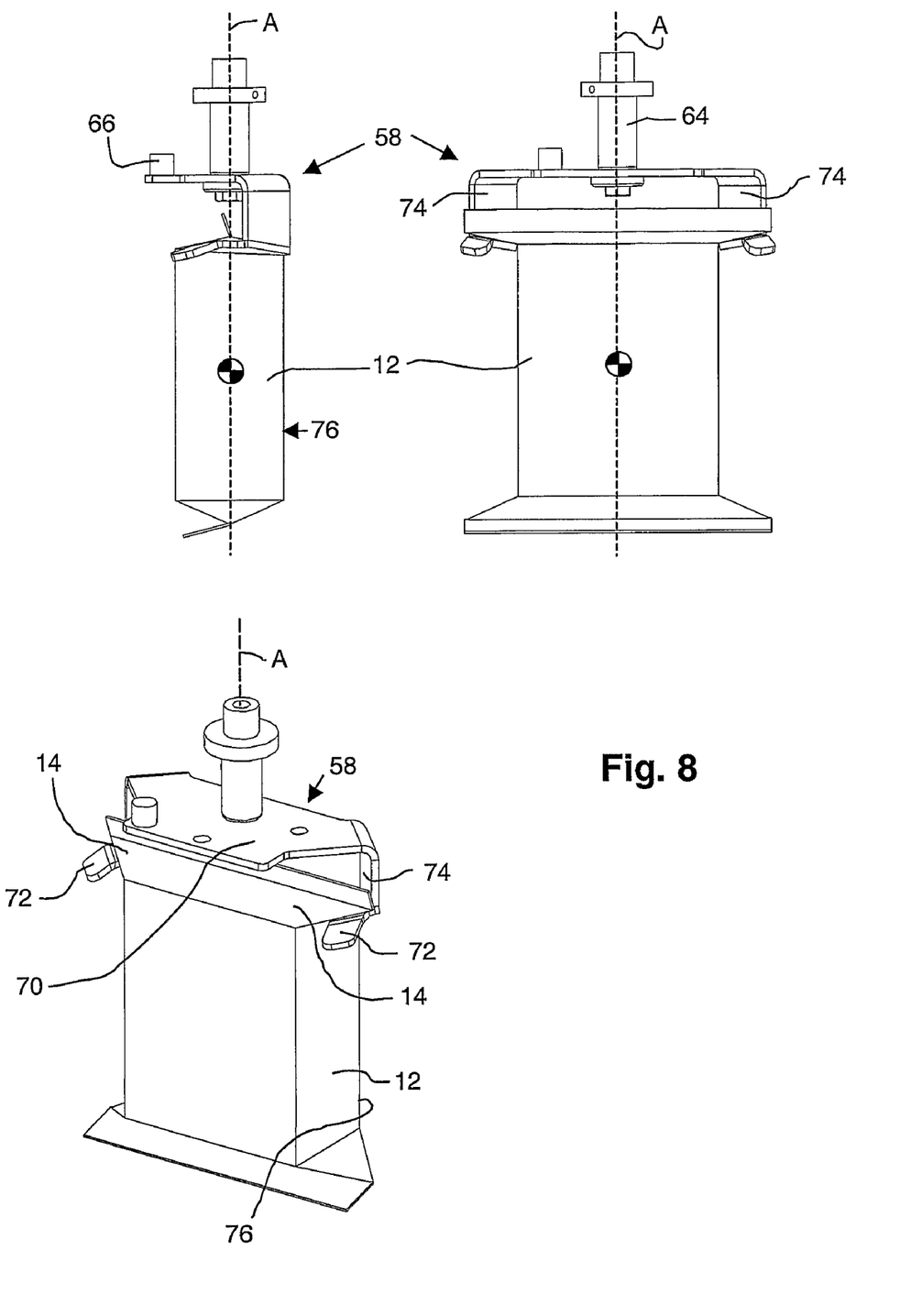
FIG. 8 schematically shows a number of views of the carrier unit carrying a packaging container.

A shaft 64 runs along the axis of rotation A, see FIG. 8, this shaft being, in one end, fixedly connected to the carrier unit 58 and, in its other end, cooperates with a guide wheel (not shown). Between the guide wheel and the carrier unit, the shaft 64 is journalled in a hole (not visible) in the first carrier member 30 so that the carrier unit 58 is oriented outwards towards the outer periphery of the conveyor 26, while the guide wheel is oriented inwards towards the central parts of the conveyor 26. The carrier unit 58 is provided with a pin 66 which is adapted to run in a track 68 or elongate hole in the second carrier member 32. Thus, the carrier members 30, 32 are connected to one another by means of the carrier unit 58 and are displaceable towards and away from one another along the shafts 38.

The carrier unit 58 is provided with a central part 70 and two finger portions 72, see FIG. 8. A pair of finger portions 72 are adapted to be able to carry a packaging container 12 and the finger pairs 72 are disposed in relation to the shaft 64 such that the point of gravity of the packaging container will coincide with the geometric axis of rotation A when the packaging container 12 is carried and rotated by the carrier unit 58. Thus, the shaft 64 is located on the central part 70 at half of the mutual distance between the finger portions 72. While the packaging container 12 is located in its first orientation 20, the finger portions 72 point in a direction transversely of the direction of transport of the packaging containers, and while the packaging container 12 is located in its second orientation 22, they point in a direction substantially rearwards in relation to said direction of transport. However, the finger portions 72 are angled somewhat outwards in order to facilitate catching and positioning of the packaging container 12 in the carrier unit 58. However, in the disclosure of directions in which the finger portions 72 point, this angle is disregarded in the text. Each finger portion 72 further cooperates with an arrest heel 74 on the central part 70. The arrest heels 74 are positioned such that, when the packaging container 12 is carried by the carrier unit 58, they will each abut against a folding edge of each respective triangular corner flap, see FIG. 8. They may be described as taking up forces in a plane corresponding to the rear side of the packaging container, see reference numeral 76.

Figure 2B:
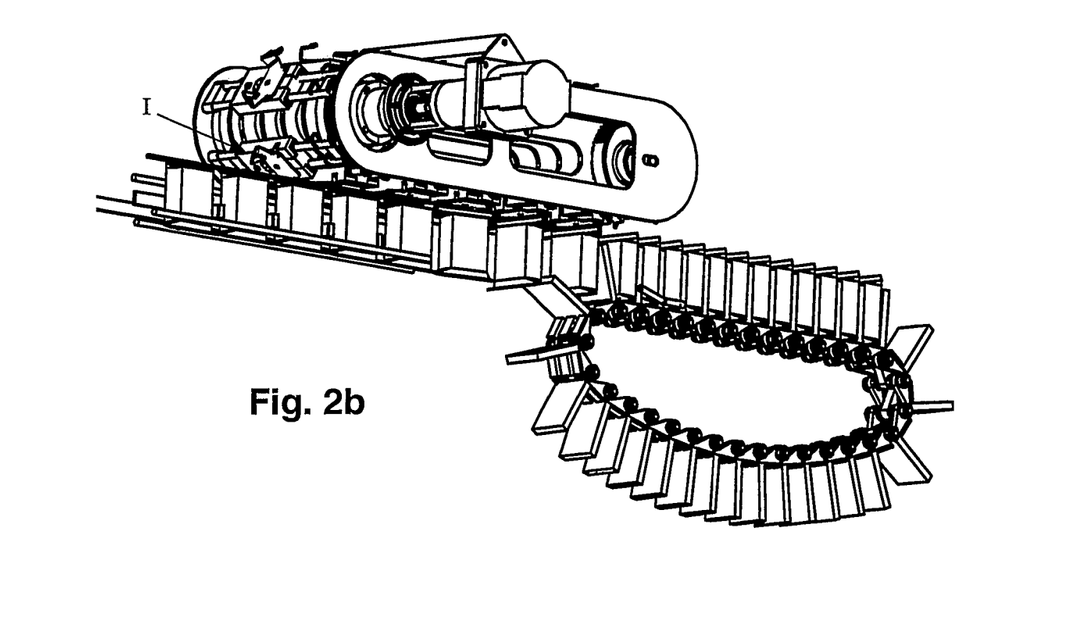
FIG. 2b schematically shows the apparatus in a view obliquely from beneath (in order to facilitate an understanding of the views in FIG. 2a)

Views I-V in FIG. 2*a* are represented in a manner which corresponds to that picture which would be obtained if being placed beneath the feeder device in FIG. 1 and looking upwards, see FIG. 2*b*. The I in FIG. 2*b* shows where the view I in FIG. 2*a* is taken. The different positions of the carrier members 30, 32 on the rotation will now be described and the mechanics behind the rotation principle is based largely on the feature that at least one of the carrier members is displaceable in relation to the other in a first direction, and that the carrier unit 58 is rotatably connected to each of the carrier members where each respective rotatable connection is located a distance from one another in a second direction transversely of said first direction. The left-hand view I in FIG. 2*a* shows a first position where both of the carrier members 30, 32 are located in a first, protracted position. This first position has its counterpart in the first orientation 20 of the packaging containers 12 and the carrier unit 58 is oriented so that the finger portions 72 are directed in a direction substantially parallel with the shafts 38, i.e. transversely of the direction of transport of the packaging containers, and it may be seen that the pin 66 makes an angle $\beta_1$ in relation to the shafts 38. In the example, the angle $\beta_1 = 45°$. Before the turning to the second orientation begins, both of the carrier members 30, 32 are displaced along the shafts 38, see view II-III. This movement will be described later. On the other hand, view IV shows commenced turning to the second orientation 22. The distance between the first and second carrier members 30, 32 has changed and in the view designated V they are located in a second, diverging position. The second carrier member 32 has then been displaced away from the first carrier member 30 along the shafts 38. The pin 66 now makes an angle $\beta_2$ with the shafts 38. In the example, the angle $\beta_2 = 135°$ and the carrier unit 58 has now been rotated to its second position where it is oriented so that the finger portions 72 are substantially at right angles to the above mentioned shafts 38. This second position has its counterpart in the second orientation 22 of the packaging container 12. The difference $\beta_2 - \beta_1$ thus corresponds to the angle between the first and the second orientation 20, 22 of the packaging container 12, i.e. the rotation. In this case, the rotation will be 90°. The turning, or rotation, which is carried out takes place clockwise with reference to FIG. 1, or counter-clockwise with reference to FIG. 2*a*, so that the finger portions 72 in the second position will point in a direction away from the outgoing conveyor 18, i.e. they point in a direction substantially rearwards in relation to the direction of transport of the packaging containers (to the left in FIG. 1).

The change from the first position to the second position and vice versa will now be described with reference to FIGS. 9 and 10. FIG. 10 shows that the conveyor 26 is provided with stationary guides in the form of a first, a second and a third track, designated 1, 2 and 3, respectively, formed along the conveyor 26 in the direction of rotation. The tracks 1 to 3 are located inside the toothed belts 34, 35, i.e. the toothed belts 34, 35 run outside the tracks 1 to 3 in such a manner that guide wheels (not shown) or guide pins on the underside of the carrier members 30, 32 can run in the tracks 1 to 3 when the toothed belts are driven. Preferably, the first and second carrier members 30, 32 are each provided with one guide wheel.

Figure 9:
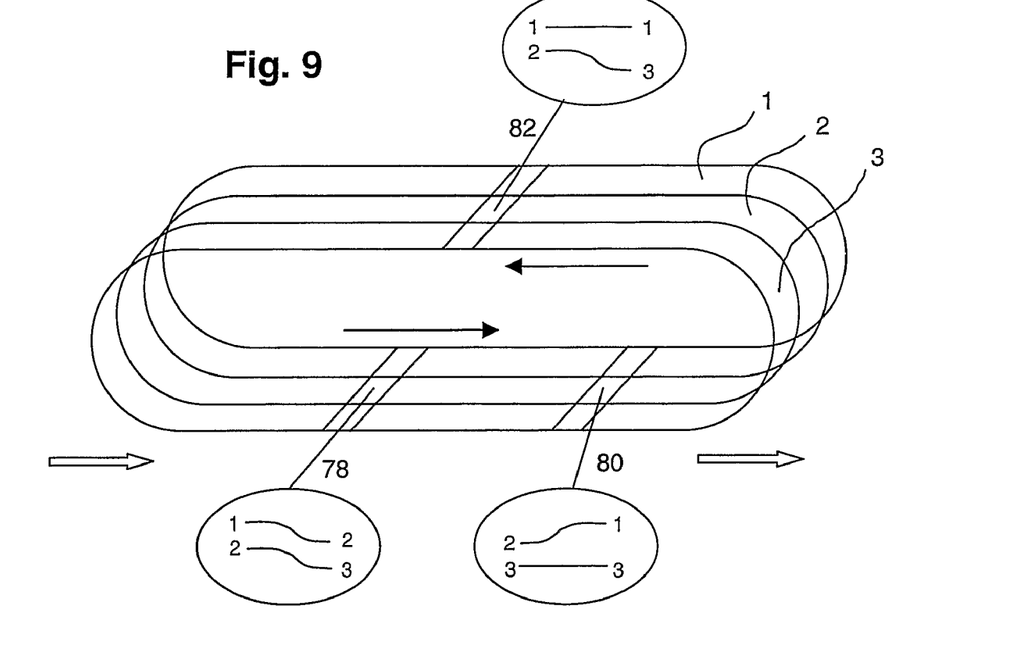
FIG. 9 schematically shows a sketch of the tracks and the switching sections.

Along the tracks 1 to 3, there are three fixed track change regions, see FIG. 9, each comprising a switching section designated 78, 80 and 82, respectively. The first switching section 78 is positioned in that point where the packaging containers 12 are to be taken up from the incoming conveyor 16, i.e. where the apparatus 10 is to carry the packaging containers 12. Ahead of the first switching section 78, the second carrier member 32 in guided in the first track 1 and the first carrier member 30 in the second track 2. When the first and second tracks 1, 2 are adjacent one another, the carrier members 30, 32 are thus located in their first, protracted position (see also view I in FIG. 2*a*) and the finger portions 72 point in a direction towards the third track 3. The incoming conveyor 16 is placed in relation to the apparatus 10 so that the packaging containers 12 move in a direction parallel with the tracks 1 to 3, in the proximity of the third track 3, and the finger portions 72 are not capable of touching the packaging containers 12 when the carrier members 30, 32 are guided in the first and second tracks 1, 2. However, at the first switching section 78, each pair of finger portions 72 is to grasp about each respective packaging container 12. This is put into effect in that the carrier unit 58 is moved with its finger portions 72 in a direction transversely of the tracks 1 to 3, i.e. towards the third track 3 and towards the packaging containers 12. This lateral displacement is achieved in that the first switching section 78 comprises a transition from the first track 1 to the second track 2, as well as a transition from the second track 2 to the third track 3, i.e. after the first switching section 78, the second carrier member 32 is guided in the second track 2 and the first carrier member 30 is guided in the third track 3. A lateral displacement has then been obtained without the carrier unit 58 having been rotated, see view II and III in FIG. 2*a*. At this first switching section 78, the finger portions 72 are thus projected in under the corner flaps 14 of the packaging container until such time as the arrest heel 74 at the finger portions 72 comes into abutment against each respective folding edge of the corner flaps 14. After the first switching section 78, the incoming conveyor 16 deviates away from the apparatus 10 and the packaging containers 12 will thus be freely suspended in the finger portions 72 of the carrier units 58, that is, the finger portions 72 are abutting under the corner flaps 14.

The second switching section 80 is located after the first switching section 78 but before that point where the packaging containers 12 are to be fed further to the outgoing conveyor 18. This second switching section 80 is comprised in a turning region where the packaging containers 12 are to change orientation from the first orientation 20 to the second orientation 22. The turning, which requires that the second carrier member 32 be displaced away from the first, is realised in that this switching section 80 only comprises one transition from the second track 2 to the first track 1. This means that the second carrier member 32 after the switching section 80 is guided in the first track 1 and the first carrier member 30 also continues to be guided in the third track 3. The carrier members 30, 32 are thereby forced apart and the carrier unit 58 is rotated through 90°. The packaging container 12 thereby assumes its second orientation 22, see view V in FIG. 2*a*.

The third switching section 82 is placed before that point where the packaging containers 12 are adapted to be capable of being taken care of from the incoming conveyor 16 and after that point where the packaging containers 12 are fed further to the outgoing conveyor 18. This switching section 82 is formed so that the second carrier member 32 will, after the switching section 82, be guided in the first track 1 and the first carrier member 30 will be guided in the second track 2, which means that the switching section 82 is formed with a transition for the first carrier member 30 from the third track 3 to the second track 2. The carrier members 30, 32 are thereby brought together again to their first position, which implies that the carrier unit 58 has been turned back to an orientation where the finger portions 72 of the carrier unit 58 are oriented with their longitudinal direction substantially directed in a direction transversely of the tracks 1 to 3, i.e. that position which has its counterpart in the first orientation 20 of the packaging container. This rotation is through 90°. The carrier unit 58 can then grasp a packaging container 12 when it once again reaches the first switching section 78.

In the example, each of the switching sections 78-82 are in the form of a block which is placed transversely of the three tracks 1 to 3, and the block is provided with substitute tracks 84. If no transition is to take place to another track, the substitute tracks 84 in the block connect the original tracks, see the first track 1 in FIG. 10. If, however, a transition is to take place from, for example, the second track 2 to an adjacent track, for example the third track 3, the substitute track 84 is a curved track section whose opening is located in the second track 2 and whose outlet discharges in the adjacent third track 3, see FIG. 10. The switching sections 78-82 may advantageously be manufactured from plastic, while the tracks 1 to 3 may be manufactured from, for example, sheet metal. The first and second switching sections may further preferably be manufactured in one block.

As was intimated above, the packaging containers 12 are transferred to the outgoing conveyor 18 after the turning operation, i.e. after having passed the second switching section 80. The outgoing conveyor 18 is placed in relation to the apparatus 10 such that the line which the packaging containers 12 move along after the turning operation coincides with the line along which the packaging containers 12 will move in the outgoing conveyor 18. Thus, each packaging container 12 will retain its direction of movement also after transfer to the outgoing conveyor 18. In this example, each packaging container 12 is transferred in a point where the conveyor 26 deviates around its second journal point. As the finger portions 72 are turned to face in a direction away from the outgoing conveyor 18, their grip on the corner flaps 14 of the packaging container will automatically be released when they are turned around the journal point and/or catch up with or are braked by a carrier unit 24, i.e. when the finger portions 72 are moved in an upward direction in FIG. 1, while the packaging container 12 continues in its earlier direction of movement in that it is caught by the carrier units 24. The carrier units 24 are in the form of plates which have been mounted substantially at right angles to the chain of the outgoing conveyor 18. The speed of the outgoing conveyor 18 is slightly slower than the speed of the apparatus, and the packaging containers are braked by the carrier units 24. The risk that the packaging containers 12 be damaged on transfer is however minimal given that the contents of the packaging containers give no significant motional effect on the packaging container 12 and that the surface of the carrier unit 24 which meets the packaging container 12 is of the same order of magnitude as the surface of the packaging container 12 which comes into abutment against the carrier unit 24.

Even though the present invention has only been described with respect to one currently preferred embodiment, it should be obvious to the skilled reader that the present invention is not restricted thereto, but that numerous variations and modifications are conceivable without departing from the scope of the appended Claims.

One example of how the carrier unit may be secured to the carrier members has been described. However, it should be understood that there are a multiplicity of other ways of effecting the securement. For example, the carrier unit 58 may be non-rotationally connected to one end of a linkage arm via a shaft which is rotatably journalled in one of the carrier members, that the linkage arm at the other end is provided with a pin which is moveable in a groove in the second of the carrier members, and that the mutual relationship of the shaft and the pin is such that a displacement of at least one of the carrier members in relation to the other entails a rotation of the carrier unit 58 which corresponds to a change of the orientation of the packaging container 12 from the first orientation 20 to the second orientation 22. The one end of the previously described shaft 64 is thus non-rotationally connected to the carrier unit 58, while the other end is fixedly connected to a linkage arm. The shaft 64 is, as previously, journalled in a hole in the first carrier member 30. The carrier unit 58 is located on the one side of the carrier member 30 and the linkage arm is located on the other side. Further, the carrier unit 58 is oriented outwards towards the outer periphery of the conveyor 26, while the linkage arm is oriented inwards towards the central parts of the conveyor 26. The free end of the linkage arm is provided with a pin, corresponding to the pin 66, which is adapted to run in a groove corresponding to the previously described track 68.

Three tracks 1 to 3 and three switching sections 78, 80, 82 have been described. However, it should be obvious to the skilled reader of this specification that the number of tracks and switching sections may be altered depending upon practical application. For example, the turning operation need not be carried out in one step at a switching section, but may, for example, be made stepwise over a number of switching sections and tracks.

The carrier unit with finger portions which has been described above is suitable for supporting parallelepipedic packaging containers where the triangular corner flaps have not yet been folded and sealed against the sides of the packaging container. If another type of package is to be supported, or if the intention is to support the parallelepipedic packaging containers in a different manner, the formation of the carrier unit may naturally be of another type known to a person skilled in the art. For example, the carrier unit may be formed as a gripping device which is capable of grasping about the packaging container. For example, a gripping device may be provided which is capable of grasping about, for example, the fin or fins which are formed on sealing of the transverse edges of the packaging container.

It should further be understood that the first and second orientation of the packaging containers are not restricted to the illustrated orientations and that the disclosed angles may also be amended so that the number of degrees through which the rotation moves will be different.

What is claimed is:

1. An apparatus comprising a turning mechanism which is adapted to change an orientation of a number of packaging containers, having corner flaps pointing substantially straight out from sides of the packing container, in motion in a filling machine, from a first orientation to a second orientation, comprising:

a conveyor provided with at least one carrier to which at least one carrier unit is connected;

the carrier unit being rotary in relation to the carrier about a geometric axis of rotation and adapted to carry the packaging container in such a manner that the point of gravity of the packaging container during the change in orientation is substantially located on the geometric axis of rotation, and the point of gravity of the packaging container thereby maintains substantially the same direction of movement and speed from the first to the second orientation;

the carrier unit comprises a pair of finder portions adapted to carry the packaging container; and the packaging containers which are fed are each a packaging container having corner flaps pointing substantially straight out from sides of the packaging container, and the finger portions of the carrier unit are adapted to carry the packaging container by abutting under the corner flaps.

2. The apparatus as claimed in claim 1, wherein the carrier comprises a first carrier member and a second carrier member; at least one of the first and second carrier members being displaceable in relation to the other of the first and second carrier member in a first direction; and the carrier unit being rotatably connected to each of the first and second carrier members where each respective rotary connection is located a distance from each other in a second direction transversely of said first direction.

3. The apparatus as claimed in claim 2, wherein the carrier unit is non-rotationally connected to a shaft which is journalled in one of the carrier members; the carrier unit being further provided with a pin which is moveable in a track provided in the second carrier member; and a mutual relationship of the shaft and the pin is such that a displacement of at least one of the carrier members in relation to the other entails a rotation of the carrier unit which corresponds to a change of orientation of the packaging container from the first to the second orientation.

4. The apparatus as claimed in claim 3, wherein the shaft coincides with the geometric axis of rotation.

5. The apparatus as claimed in claim 2, wherein the carrier members are moveable in relation to one another in that the conveyor comprises a number of tracks which each form a loop; the carrier members being guided in the tracks; and the tracks comprising switching sections which each permit at least one of the carrier members to change tracks.

6. The apparatus as claimed in claim 2, wherein the carrier members are displaceably journalled on at least one shaft, said shaft being interconnected with a belt, provided for the conveyor, by way of a clamping device.

7. The apparatus as claimed in claim 6, wherein the belt is comprised in a belt transmission which also comprises at least one pulley over which the belt is adapted to run; the carrier members being displaceably journalled on two shafts, said shafts being interconnected with said belt; and centre points of the shafts are displaced a distance ($\Delta_r$) from a pitch line (L) of the belt in a direction substantially at right angles thereto outwards from the pulley so that the mutual spacing between the two shafts is of equal size when both the shafts are located over said pulley and when they are located in a portion of the transmission where the belt is substantially straight.

8. The apparatus as claimed in claim 7, wherein the length of said distance ($\Delta_r$) is the difference $r_1 - r_0$, where $r_0$ is the radius from the centre of the pulley to the pitch line (L) and $r_1$ is calculated in accordance with the formula $$r_1 = \frac{a}{2\sin\left(\frac{a}{2r_0}\right)}$$

where a is the mutual spacing between the two shafts when the belt is straight.

9. The apparatus as claimed in claim 6, wherein the belt is a toothed belt.

10. The apparatus as claimed in claim 9, wherein the clamping device for securing the shaft to the belt comprises a first part adapted for whole or partial abutment in a tooth gap in the belt and in a support in the shaft, said support forming continuations of the tooth gap at each end thereof and in which support the first part is configured to be snapped down;

and wherein the first part at each end is connected to a second part formed as a yoke element, said yoke element being adapted to surround the shaft so that there is formed a wrapping angle between abutment points of the first part in the support in the shaft and abutment points of the yoke element against the shaft which is sufficiently large for geometry of the shaft to retain the clamping device in a secured position.

11. The apparatus as claimed in claim 10, wherein the shaft is provided with at least one depression adapted to at least partly accommodate the belt and in which depression the support is placed.

12. The apparatus as claimed in claim 2, wherein the carrier unit is rotated through substantially 90° so that the second orientation of the packaging containers is at right angles to the first orientation.

13. The apparatus as claimed in claim 1, wherein the finger portions cooperate with at least one arrest heel which is adapted to abut against one fold edge of each respective corner flap.

14. The apparatus as claimed in claim 1, wherein the carrier unit is rotated through substantially 90° so that the second orientation of the packaging containers is at right angles to the first orientation.

15. The apparatus as claimed in claim 1, wherein the finger portions, while the container is located in its first orientation, point in a direction substantially transversely of the direction of transport of the containers; and the finger portions, while the container is located in its second orientation, point in a direction substantially rearwards in relation to said direction of transport.

16. The apparatus as claimed in claim 1, wherein the carrier unit is provided with a pair of finger portions adapted to carry the packaging container, and said finger portions are adapted in relation to the geometric axis of rotation such that the point of gravity of the packaging container coincides with said axis of rotation.

17. A method of changing an orientation of a number of packaging containers in motion in a filling machine, from a first orientation to a second orientation, the packaging containers possessing corner flaps pointing substantially straight out from sides of the packaging containers, the method comprising:
   carrying a packaging container by a carrier unit which is connected to a carrier in a moving conveyor;
   the carrying of the packaging container comprising finger portions of the carrier unit abutting under the corner flaps of the packaging container; and
   turning the carrier unit in relation to the carrier about a geometric axis of rotation to change the orientation of the packaging container in such a manner that the point of gravity of the packaging container during the change in orientation is substantially located on the geometric axis of rotation, the point of gravity of the packaging container thereby retaining substantially the same direction of movement and speed from the first to the second orientation.

18. A method of changing rotational orientation of packaging containers in motion in a filling machine, the packaging containers each comprising a pair of corner flaps extending substantially straight out from sides of the packaging container, the method comprising:
   engaging each of the corner flaps of one of the packaging container with a respective finger portion of a carrier unit moving together as a unit with a moving conveyor;

rotating the carrier unit moving with the conveyor while the finger portions of the packaging container are engaging the corner flaps to rotate the packaging container from a first rotational orientation to a second different rotational orientation to effect a change in orientation of the packaging container; and the rotating of the carrier unit comprising rotating the carrier unit about a geometric axis of rotation in such a manner that the point of gravity of the packaging container during the change in orientation from the first rotational orientation to the second rotational orientation is substantially located on the geometric axis of rotation.

19. The method according to claim 18, wherein the carrier unit connects together a first carrier member and a second carrier member, the first and second carrier members being slidably mounted on a pair of shafts.

* * * * *